(12) United States Patent
Creech et al.

(10) Patent No.: US 12,534,864 B2
(45) Date of Patent: Jan. 27, 2026

(54) SHORELINE STABILIZATION DEVICE

(71) Applicant: THE DAVEY TREE EXPERT COMPANY, Kent, OH (US)

(72) Inventors: Frederick Worth Creech, Raleigh, NC (US); Mary-Margaret Sykes McKinney, Edenton, NC (US)

(73) Assignee: The Davey Tree Expert Company, Mantua, OH (US)

( * ) Notice: Subject to any disclaimer, the term of this patent is extended or adjusted under 35 U.S.C. 154(b) by 154 days.

(21) Appl. No.: 18/470,994

(22) Filed: Sep. 20, 2023

(65) Prior Publication Data
US 2024/0011233 A1 Jan. 11, 2024

Related U.S. Application Data

(63) Continuation-in-part of application No. 17/702,017, filed on Mar. 23, 2022, now Pat. No. 11,946,215.

(51) Int. Cl.
| | |
|---|---|
| *E02B 3/04* | (2006.01) |
| *E02B 3/06* | (2006.01) |
| *E02B 3/12* | (2006.01) |

(52) U.S. Cl.
CPC .............. *E02B 3/129* (2013.01); *E02B 3/046* (2013.01); *E02B 3/06* (2013.01)

(58) Field of Classification Search
CPC .... E02B 3/04; E02B 3/046; E02B 3/06; E01F 7/02; E04H 17/1404; E04H 17/1408
USPC ........................................ 405/15, 33, 34, 35
See application file for complete search history.

(56) References Cited

U.S. PATENT DOCUMENTS

| | | |
|---|---|---|
| 5,113,732 A | 5/1992 | Hansch |
| 5,599,136 A | 2/1997 | Wilke |
| 7,827,937 B1 | 11/2010 | Walter |
| 7,992,509 B1 | 8/2011 | Veazy |
| 8,979,427 B2 | 3/2015 | Farrell, Jr. |
| 10,053,827 B2 | 8/2018 | Martin et al. |
| 2011/0305511 A1 | 12/2011 | Heselden |

(Continued)

FOREIGN PATENT DOCUMENTS

KR 1738836 * 5/2017

OTHER PUBLICATIONS https://www.britannica.com/dictionary/unitary; 2025.*

(Continued)

*Primary Examiner* — Sean D Andrish
(74) *Attorney, Agent, or Firm* — TUCKER ELLIS LLP

(57) ABSTRACT

A system is provided for shoreline stabilization using a plurality of shoreline stabilization devices, having a base portion, which may be a solid structure or be formed from at least first two of the shoreline stabilization devices arranged in an end to end configuration on opposite sides of an imaginary line running perpendicular to the two shoreline stabilization devices; the base portion having a central protrusion or having at least one of the shoreline stabilization devices positioned perpendicular to and on top or in between the first two shoreline stabilization devices, and atop the imaginary line; and at least a second two of the plurality of shoreline stabilization devices each positioned on opposite sides of the imaginary line at an angle to provide at least two angled shoreline stabilization devices, forming an angle between a slope of between about 1.5:1 and 2:1.

9 Claims, 7 Drawing Sheets

(56) References Cited

U.S. PATENT DOCUMENTS

| | | | |
|---|---|---|---|
| 2014/0013554 A1* | 1/2014 | Hojaji | C08K 11/00 27/1 |
| 2016/0044899 A1 | 2/2016 | Bartkowski | |
| 2016/0067883 A1* | 3/2016 | Hilton | B28B 7/18 264/300 |
| 2016/0312427 A1 | 10/2016 | De Groot | |
| 2017/0028585 A1 | 2/2017 | Hilton | |
| 2023/0031467 A1 | 2/2023 | Creech, Jr. et al. | |
| 2023/0304244 A1 | 9/2023 | Creech, Jr. et al. | |

OTHER PUBLICATIONS

Frederick Worth Creech, Jr.; Non Final Office Action dated 03/22/203—U.S. Appl. No. 17/702,017, filed Mar. 23, 2022; 8 pgs.
Frederick Worth Creech, Jr.; Final Office Action dated 09/29/203—U.S. Appl. No. 17/702,017, filed Mar. 23, 2022; 6 pgs.

\* cited by examiner

SHORELINE STABILIZATION DEVICE

CROSS REFERENCE TO RELATED APPLICATIONS

This application is a continuation-in-part of U.S. non-provisional application Ser. No. 17/702,017 filed on Mar. 23, 2022, and which is incorporated herein in its entirety by reference.

BACKGROUND OF THE INVENTION

Field of the Invention

The present invention relates to various configurations of a plurality of shoreline stabilization devices and the shoreline stabilization systems produced thereby.

Description of Related Art

The erosion of coastal shorelines (and other similar shorelines) by both natural and man-made activities has become a very serious and urgent matter having detrimental effects in some areas of the world. There has been much work in developing shoreline stabilization devices, especially ones capable of supporting aquatic life. Both attenuation of erosion by waves, as well as a need to reinforce the shoreline, are the primary uses of such devices.

While there are many examples of such shoreline devices, there are serious and inadequate problems with the currently used devices. These problems include use of plastics, introduction of loose fibers to the shoreline, a lack of means to prevent wave erosion, the need to regrade the shoreline, the need to position plants in the device, and devices that are primarily made of cement. In addition, shoreline stabilization may need to be customized to the type of shoreline and to the extent of erosion. What is needed is a system of arranging shoreline devices that best supports living growth, shoreline fortification, and wave erosion reduction without the drawback of the current ways of arranging the shoreline device(s).

BRIEF SUMMARY OF THE INVENTION

It has been discovered that a particular positioning and configuration of shoreline stabilization devices can provide a system for shoreline stabilization having improved aquatic habitat function, oyster recruitment, and wave attenuation when compared to other positional configurations.

An additional advantage of the present invention provides an attenuation of wave energy rather than a deflection of wave energy at the locations of installation of the system of the present invention.

A further advantage of the present invention provides stabilization of shorelines during storm activity, particularly strong oceanic storms such as hurricanes, by creating a system that disrupts strong tidal movement and maintains aquatic habitat function even under such extreme conditions.

Accordingly, the present invention in certain embodiments relates to a system for shoreline stabilization comprising:
a plurality of shoreline stabilization devices;
wherein at least a first two of the plurality of shoreline stabilization devices are arranged in an end to end configuration on opposite sides of an imaginary line running perpendicular to the at least first two shoreline stabilization devices, wherein the ends of the at least first two shoreline stabilization devices nearest the imaginary line align with one another at least in part;
wherein at least one of the plurality of shoreline stabilization devices is positioned perpendicular to and on top or in between the first two shoreline stabilization devices, and atop the imaginary line; and
wherein at least a second two of the plurality of shoreline stabilization devices are each positioned on opposite sides of the imaginary line at an angle relative to the at least first two shoreline stabilization devices to provide at least two angled shoreline stabilization devices, wherein each of the at least second two shoreline stabilization devices have a first end on top of at least a portion of one of the first two shoreline stabilization devices and a second end resting on at least one of the perpendicular shoreline stabilization devices to form an angle between a slope of between about 1.5:1 and 2:1.

In other embodiments, the present invention relates to a system for shoreline stabilization comprising:
a base section having a central protrusion from a top surface of the base section, wherein the central protrusion traverses at least a portion of a length of the base section; wherein the base section further has on the top surface of the base section and on each side of the central protrusion, an inset notch running lengthwise along at least a portion of the base section; and
a plurality of shoreline stabilization devices positioned on opposite sides of, and along the length of, the central protrusion, with a defined gap between adjacent shoreline stabilization devices on each side of the central protrusion, wherein each of the plurality of shoreline stabilization devices have a first end resting in the inset notch on the top surface on one side of the central protrusion and a second end resting on the central protrusion to form an angle between an underside of the shoreline stabilization devices and the top surface of the base section having a slope of between about 1.5:1 and 2:1.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1A:
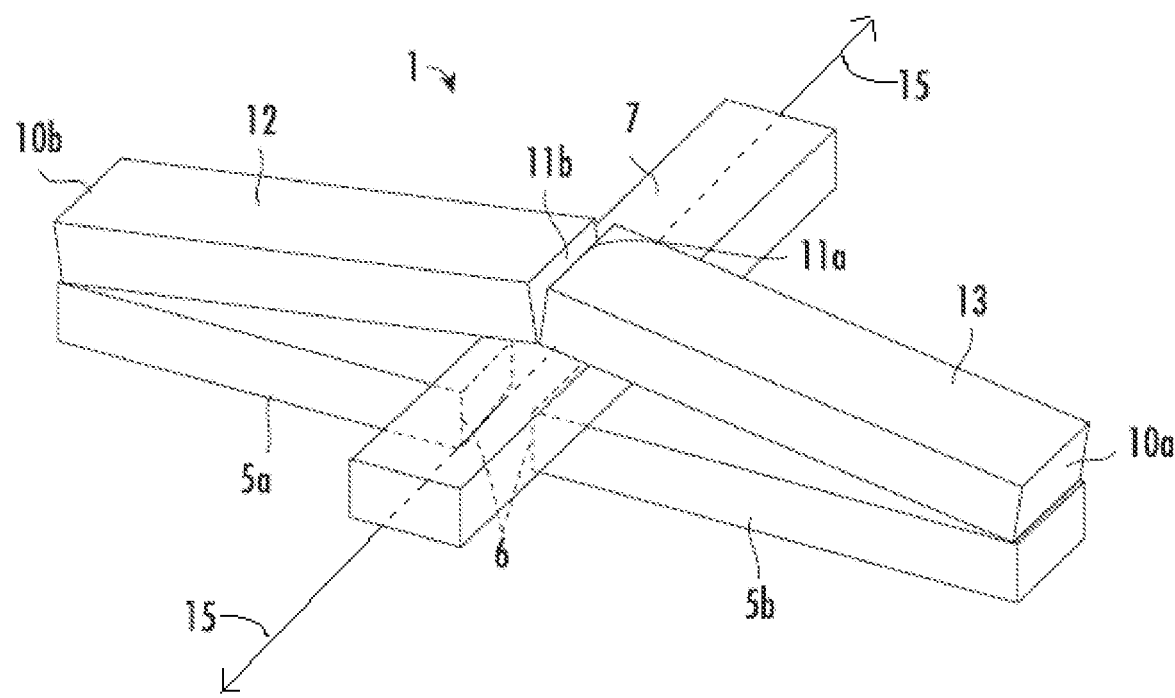
FIG. 1A is a perspective view of one embodiment of a system of the present invention having five shoreline stabilization devices.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein, and use of the term "means" is not intended to be limiting.

As used herein, the term "shoreline stabilization device" refers to one or more blocks (the blocks can be any desired shape, but are preferably rectangular from a viewpoint of ease of construction and alignment/deployment) that are positioned in the water near the shoreline. The blocks can be positioned independent of other blocks or tied together connecting all the blocks into a group of blocks.

These shoreline stabilization devices can be arranged in a variety of configurations in order to form various interstitial spaces between surfaces of adjacent shoreline stabilization devices, between multiple shoreline stabilization devices arranged at various angles relative to one another, etc. In preferred embodiments, they can be arranged in the present system as shown in the figures. In certain embodiments, a plurality of rectangular shoreline stabilization devices are arranged on opposite sides of an imaginary line running perpendicular to the orientation of the shoreline stabilization devices. Shoreline stabilization devices that lie on the same side of the imaginary line may be parallel to one another, or slightly angled relative to one another in order to accommodate the contours of the shoreline near which the system is being deployed. The adjacent shoreline stabilization devices on each side of the imaginary line may be placed touching one another, or preferably are placed with a gap between adjacent shoreline stabilization devices. This gap permits water flow through the structure without creating significant water pressures against the structure or significant disturbance of the aquatic environment and flow. When adapting the system of the present invention to the contours of a shoreline, it is possible to slightly angle the shoreline stabilization devices on one side of the imaginary line such that the ends distal to the imaginary line are slightly closer to one another than the ends proximal to the imaginary line, while the shoreline stabilization devices on the opposite side of the imaginary line are arranged such that the ends distal to the imaginary line are slightly farther apart than the ends proximal to the imaginary line. Such an alignment creates a slightly curved system to track the contour of the shoreline where the system is being installed.

In certain embodiments of the system of the present invention, there are at least five shoreline stabilization devices (or blocks), which are arranged wherein a first two of the shoreline stabilization devices are arranged in an end-to-end configuration on opposite sides of an imaginary line running perpendicular to the at least first two shoreline stabilization devices; wherein at least one of the shoreline stabilization devices is positioned perpendicular to and on top or in between the two first shoreline stabilization devices, and atop the imaginary line; and wherein at least a second two of the plurality of shoreline stabilization devices are each positioned on opposite sides of the imaginary line at an angle relative to the at least first two shoreline stabilization devices to provide at least two angled shoreline stabilization devices, wherein each of the at least second two shoreline stabilization devices have a first end on top of at least a portion of one of the first two shoreline stabilization devices and a second end resting on at least one of the perpendicular shoreline stabilization devices to form an angle between a slope of between about 1.5:1 and 2:1.

The device can also, in one embodiment, have reinforcing rods like rebar to stabilize the block, especially for blocks that are larger. The limiting factor of the size of the blocks is the weight and how well it conforms to the shoreline in shape.

The shoreline stabilization devices of embodiments of the present invention can be any desired size. In preferred embodiments, the shoreline stabilization devices take the form of blocks having a height of from 2 to 6 inches, a width of from 6 to 14 inches and a length of from 25 to 50 inches. More preferably, the blocks have dimensions of a height of 4 to 4.5 inches, a width of 10 to 10.5 inches, and a length of from 30 to 40 inches. The size of the blocks can be selected based on a variety of factors including the size of system that is intended, the ease of deployment of the blocks in construction of the system, and the depth of water in which the system is deployed. The blocks in certain embodiments have a weight of from 90 to 130 lbs, preferably 100 to 120 lbs each.

In certain embodiments of the present invention, the system comprises a plurality of sets of shoreline stabilization devices, wherein each set comprises the at least first two shoreline stabilization devices and the at least second two angled shoreline stabilization devices, wherein each set is separated from an adjacent set by a defined gap, wherein each of the at least second two angled shoreline stabilization devices span the defined gap formed by two of the adjacent first shoreline stabilization devices on a same side of the imaginary line, and wherein the defined gap is narrower than a width of the shoreline stabilization device spanning the defined gap. These various gaps, and the interstitial spaces formed between the angled shoreline stabilization devices and the shoreline stabilization devices on the bottom of the configuration (the "at least first two shoreline stabilization devices"), permit movement of water through the system after deployment, while providing a sheltered area for various mollusks, such as oysters, to anchor and grow.

In embodiments of the present invention, the at least one perpendicular shoreline stabilization device can be a single device that runs the full length of the deployed system, or can be a plurality of devices. In the case where the at least one perpendicular shoreline device is a plurality of devices, these can be arranged in a single layer in an end-to-end fashion running the length of the deployed system, or can be stacked one atop the other for any desired number of stack layers, preferably from 2 to 6 stack layers. When stacked, the devices can be arranged end to end with each junction between ends being aligned from one layer to the next, or can be stacked in a bricklike fashion, whereby the junctions between ends on one layer are offset from the junctions between ends on adjacent layers. In preferred embodiments, the bricklike structure is used, providing improved lateral strength to the stacked portion of devices.

As used herein, the term "primarily calcium carbonate material" refers to once living material from a living organism that produces portions of the organism that are primarily made up of calcium carbonate. Included are aquatic shells, like oysters, egg shells, snail shells, pearls, and the like. In embodiments of the present invention, the shoreline stabilization devices as well as the base section of other embodiments of the present invention are prepared from primarily calcium carbonate material, which can be held together by a cement or cementitious material. In certain embodiments, the shoreline stabilization devices or base section can be prepared by preparation of a mold in the desired shape and size, filling the mold with a plurality of the primarily calcium carbonate material, then addition of a sufficient amount of the cement to hold the structure together. Once the cement material has cured, the resulting structure can be removed from the mold to provide the shoreline stabilization device (block) or base section.

As used herein, the term "cement" or "cementitious material" refers to any biocompatible material, which can be used to hold the primarily calcium carbonate material together in a solid form, such as a block, and be resistant to wave action, storms, and the like. An example includes, but is not limited to, portland cement. In one embodiment, the cement is a bio-cement compatible with the primarily calcium carbonate material, which has the capability of supporting growth on the block formation by the primarily calcium carbonate material and cement. An example of such a bio-cement includes, but is not limited to, quicklime made from oyster shells.

As used herein, the phrase "end to end configuration on opposite sides of an imaginary line running perpendicular to the at least first two shoreline stabilization devices" refers to certain embodiments in which the bottom shoreline stabilization devices are arranged in an end to end fashion, with the devices either being collinear (with the ends closest to the imaginary line fully in alignment with one another) or in a staggered configuration (with the ends closest to the imaginary line only partially aligning or overlapping with one another, and in certain embodiments, with the end of each shoreline stabilization device that is toward the imaginary line overlapping with the ends of two other shoreline stabilization devices on the opposite side of the imaginary line), as shown in the figures. In certain embodiments, there can be a space between the ends of these shoreline stabilization devices closest to the imaginary line and in other embodiments, the ends of the shoreline stabilization devices are touching at the location of the imaginary line (either completely touching for collinear arrangements or touching in part for staggered arrangements).

As used herein, the term "perpendicular to" refers to one or more shoreline stabilization devices being placed perpendicular on or in between the bottom two shoreline stabilization devices and/or to the location of the imaginary line between the ends of the bottom shoreline stabilization devices. In the case of the present invention, "perpendicular to" can be exactly orthogonal (at a 90 degree angle) or essentially orthogonal (±10% of a 90 degree angle), particularly in cases where the system is being contoured to a curvature in the shoreline.

As used herein, the term "on top" refers to on top of one or more of the shoreline stabilization devices.

As used herein, the term "in between" refers to being positioned in between the shoreline stabilization devices.

As used herein, the term "positioned at an angle" refers to a shoreline stabilization device which has a first end on top of one of the bottom shoreline stabilization devices and the second end rests on one of the perpendicular shoreline stabilization devices. This creates an angle between the angled shoreline stabilization device and the bottom shoreline stabilization device(s) on which it sits. In general, this angle in relationship to the bottom shoreline stabilization devices has a slope of between about 1.5:1 and 2:1. In certain embodiments of the invention, there are two angled shoreline stabilization devices wherein each has an end that rests on one or more bottom shoreline stabilization devices on opposite sides of the imaginary line.

In further embodiments of the system of the present invention, the system system comprises a base section having a central protrusion from a top surface of the base section, wherein the central protrusion traverses at least a portion of a length of the base section; wherein the base section further has on the top surface of the base section and on each side of the central protrusion, an inset notch running lengthwise along at least a portion of the base section; and a plurality of shoreline stabilization devices positioned on opposite sides of, and along the length of, the central protrusion, with a defined gap between adjacent shoreline stabilization devices on each side of the central protrusion, wherein each of the plurality of shoreline stabilization devices have a first end resting in the inset notch on the top surface on one side of the central protrusion and a second end resting on the central protrusion to form an angle between an underside of the shoreline stabilization devices and the top surface of the base section having a slope of between about 1.5:1 and 2:1.

In these embodiments, the pairs of shoreline stabilization devices on opposite sides of the central protrusion can be positioned to fully align with one another, or can be positioned in a staggered arrangement such that the defined gap defined by two adjacent shoreline stabilization devices on one side of the central protrusion aligns with the end of a shoreline stabilization device on an opposite side of the central protrusion.

Figure 1B:
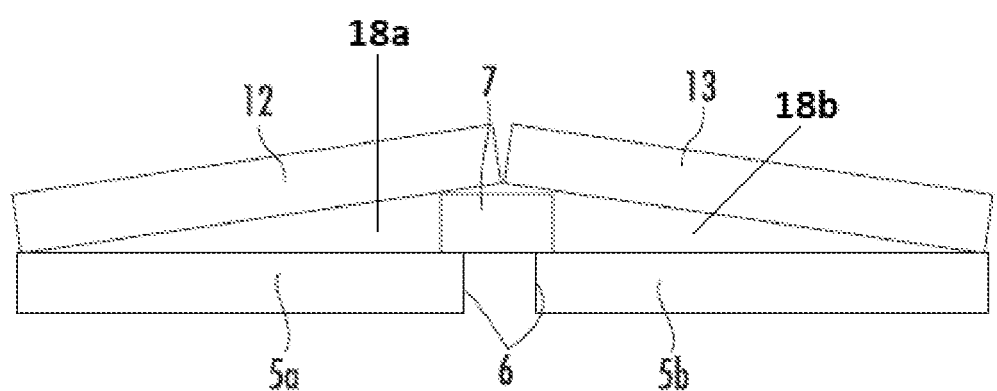
FIG. 1B is a side view of the shoreline stabilization devices of FIG. 1a of an embodiment of the present invention.

Now referring to the drawings, FIG. 1A is a perspective view of an embodiment of the shoreline stabilization device system 1, having five shoreline stabilization devices (5a, 5b, 7, 12, and 13). In this view, two first shoreline stabilization devices 5a and 5b are arranged on opposite sides of and perpendicular to an imaginary line 15 running between the ends of the shoreline stabilization devices, forming a gap 6 between shoreline stabilization devices 5a and 5b. A third shoreline stabilization device 7 is positioned perpendicular to the two shoreline stabilization devices 5a and 5b, atop and aligned with the imaginary line 15, and covering gap 6. There are two more shoreline stabilization devices that are angled compared to the two first shoreline stabilization devices 5a and 5b. A first end 10a and 10b of each angled shoreline stabilization devices 12 and 13 rests on top of and fully aligned with one of the two first shoreline stabilization devices with the second end 11a and 11b resting on the perpendicular shoreline stabilization device with a slope of between about 1.5:1 and 2:1. This angled configuration creates interstitial spaces 18a and 18b (shown in FIG. 1B) formed between the angled shoreline stabilization devices 12 and 13 and the bottom shoreline stabilization devices 5a and 5b on which they rest. FIG. 1B depicts a side view of the system of FIG. 1A (without showing the imaginary line 15).

Figure 2A:
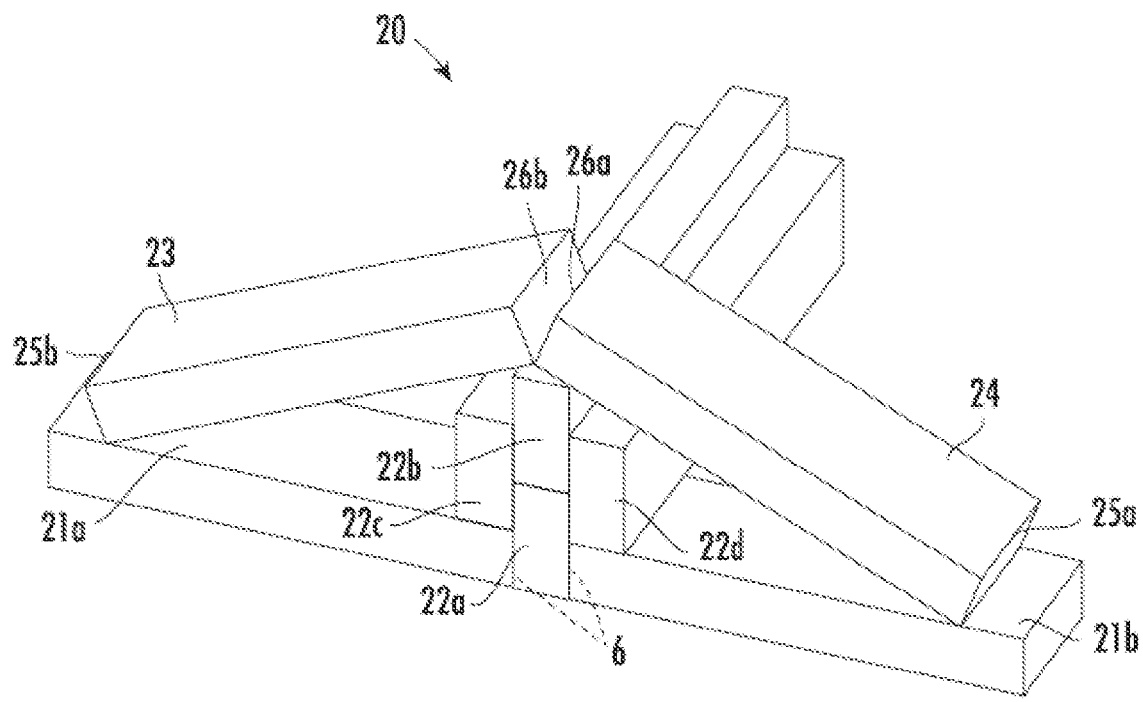
FIG. 2A is a perspective view of an embodiment of a system of the present invention having eight shoreline stabilization devices, with one of the shoreline stabilization devices positioned between two other shoreline stabilization devices.
Figure 2B:
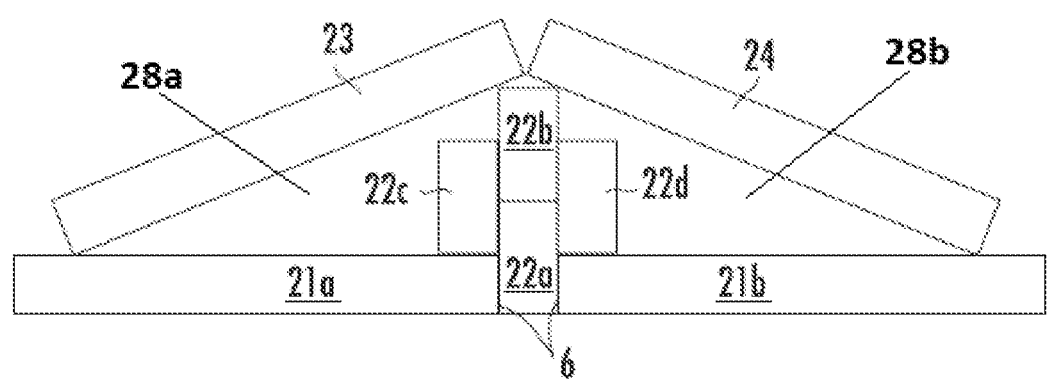
FIG. 2B is a side view of the shoreline stabilization devices of FIG. 2a of an embodiment of the present invention.

FIG. 2A shows a perspective view of a different embodiment 20 of the shoreline stabilization device system. In this view, there are eight shoreline stabilization devices (21a, 21b, 22a, 22b, 22c, 22d, 23, and 24) utilized. Similar to FIG. 1A, there are two first shoreline stabilization devices 21a and 21b that are arranged on opposite sides of and perpendicular to an imaginary line (not depicted) running between the ends of the shoreline stabilization devices with a gap 6 between shoreline stabilization devices 21a and 21b. Third, fourth, fifth, and sixth shoreline stabilization devices 22a, 22b, 22c, and 22d are positioned perpendicular to the first two shoreline stabilization devices with one 22a filling the gap 6 (and atop the imaginary line) between the first shoreline stabilization devices 21a and 21b. There are two more shoreline stabilization devices 23 and 24 that are angled compared to the two first shoreline stabilization devices 21a and 21b. A first end 25a and 25b of each angled shoreline stabilization devices 23 and 24 rests on top of one of, and fully aligned with, the two first shoreline stabilization devices with the second end 26a and 26b resting on one of the perpendicular shoreline stabilization devices 22b with a slope of between about 1.5:1 and 2:1. This angled configuration creates interstitial spaces 28a and 28b (shown in FIG. 2B) formed between the angled shoreline stabilization devices 23 and 24 and the bottom shoreline stabilization devices 21a and 21b on which they rest. FIG. 2B depicts a side view of the system of FIG. 2A.

Figure 3A:
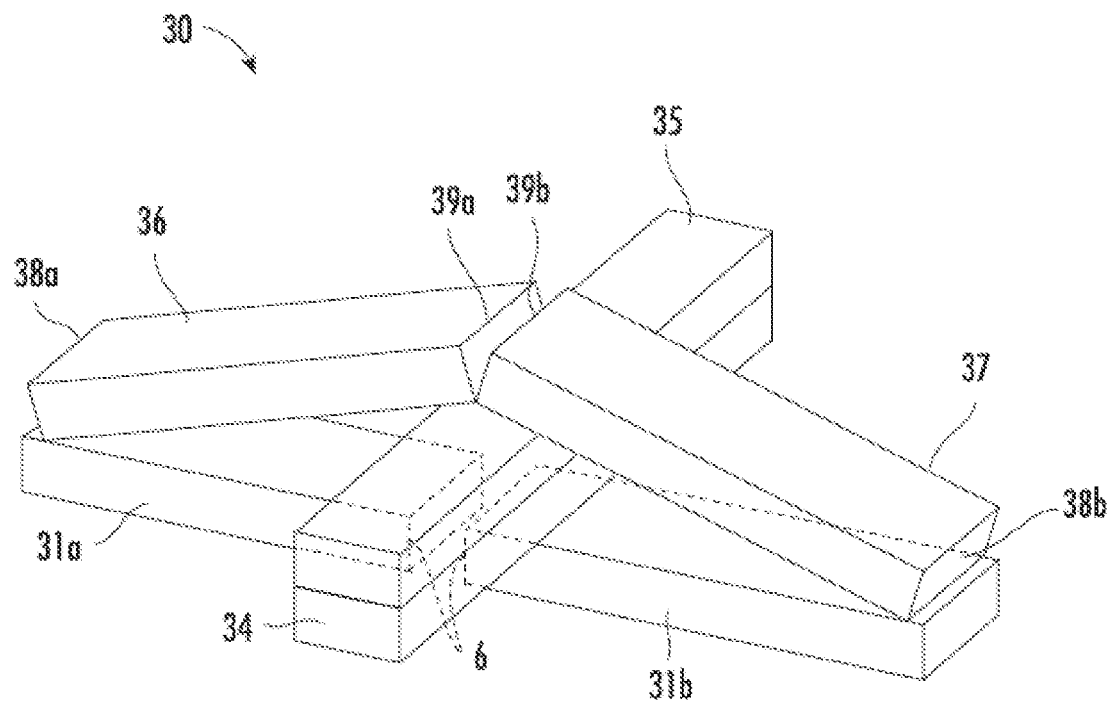
FIG. 3A is a perspective view of an embodiment of a system of the present invention having six shoreline stabilization devices.
Figure 3B:
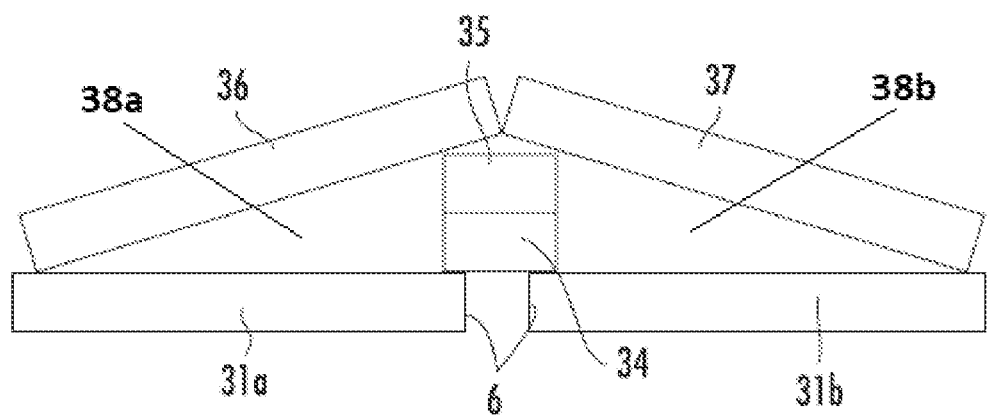
FIG. 3B is a side view of the shoreline stabilization devices of FIG. 3a of an embodiment of the present invention.

FIG. 3A shows a perspective view of a different embodiment 30 of the shoreline stabilization system. In this view, there are six shoreline stabilization devices (31a, 31b, 34, 35, 36, and 37) utilized. Similar to FIG. 1A, there are two first shoreline stabilization devices 31a and 31b that are arranged on opposite sides of, and perpendicular to, an imaginary line (not depicted) with a gap 6 (shown in FIG. 3B) between shoreline stabilization devices 31a and 31b. A third and fourth shoreline stabilization device 34 and 35 are positioned perpendicular to (and atop the imaginary line) the two first shoreline stabilization devices 31a and 31b with one shoreline stabilization device 34 covering gap 6, and the second shoreline stabilization device 35 resting on top of shoreline stabilization device 34. There are two more shoreline stabilization devices 36 and 37 that are angled compared to the two first shoreline stabilization devices 31a and 31b. A first end 38a and 38b of each angled shoreline stabilization devices 36 and 37 rests on top of, and fully aligned with, one of the two first shoreline stabilization devices 31a and 31b with the second end 39a and 39b resting on one of the perpendicular shoreline stabilization devices 35 with a slope of between about 1.5:1 and 2:1. This angled configuration creates interstitial spaces 38a and 38b (shown in FIG. 3B) formed between the angled shoreline stabilization devices 36 and 37 and the bottom shoreline stabilization devices 31a and 31b on which they rest. FIG. 3b depicts a side view of the device in FIG. 3a.

Figure 4A:
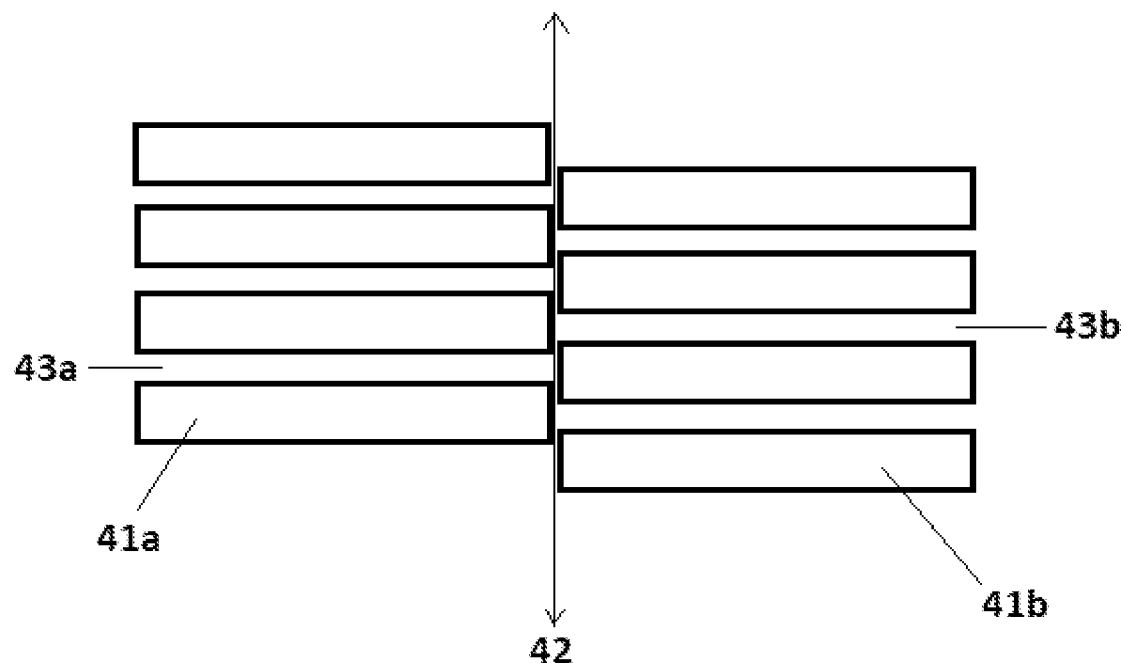
FIG. 4A is a top view of an embodiment of a system of the present invention having shoreline stabilization devices (41a and 41b) arranged in a staggered arrangement on opposite sides of an imaginary perpendicular line (42), with gap (43a and 43b) between adjacent shoreline stabilization devices.
Figure 4B:
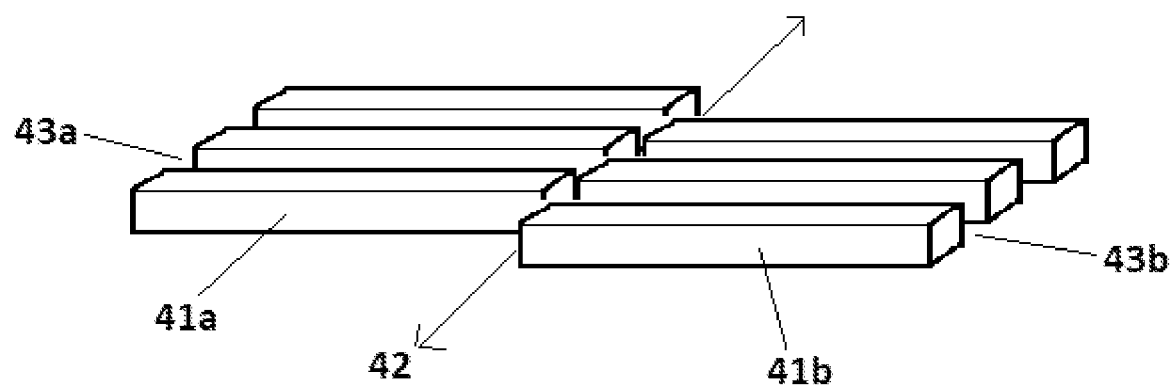
FIG. 4B is a perspective view of the embodiment of a system of the present invention of FIG. 4A.

FIG. 4A depicts a top view of a staggered arrangement of the at least two (as depicted showing eight) shoreline stabilization devices 41a and 41b, arranged on opposite sides of imaginary line 42 such that the end of shorelines stabilization devices on one side of the imaginary line 42 is partially overlapping with ends of two shoreline stabilization devices on the opposite side of the imaginary line 42. As depicted, the shoreline stabilization devices are arranged such that the ends closest to the imaginary line 42 are either touching or have a very small gap. FIG. 4B is a perspective view of the arrangement in FIG. 4A.

Figure 4C:
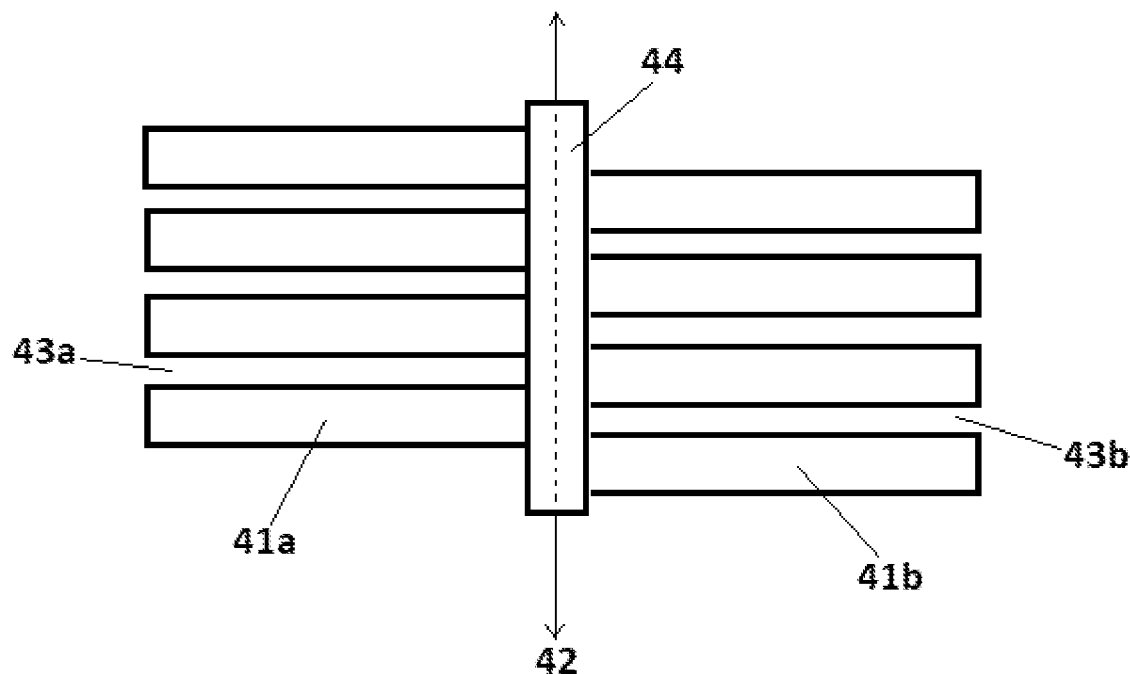
FIG. 4C is a top view of an embodiment of a system of the present invention of FIG. 4A with the added perpendicular shoreline stabilization device (44).
Figure 4D:
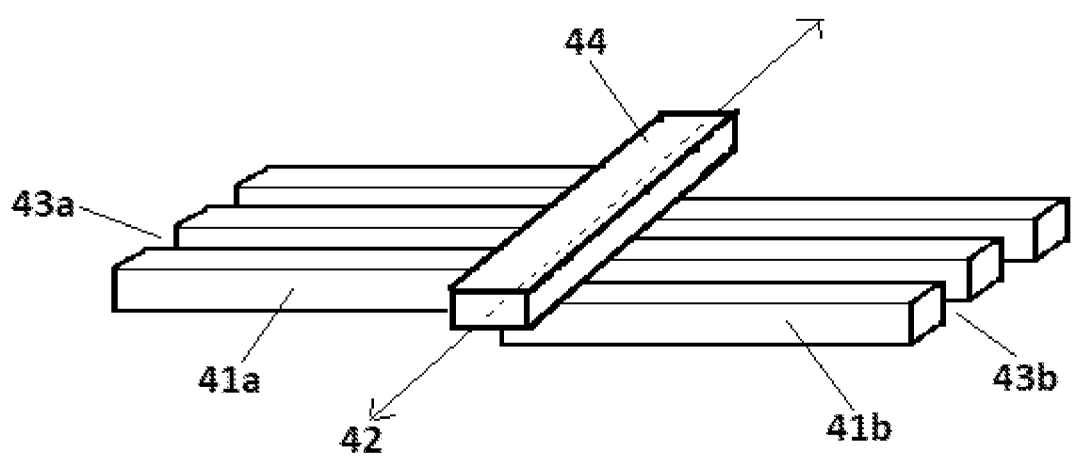
FIG. 4D is a perspective view of the embodiment of a system of the present invention of FIG. 4C.

FIG. 4C depicts a top view of the arrangement in FIG. 4A wherein a shoreline stabilization device 44 is positioned perpendicular to the shoreline stabilization devices 41a and 41b, atop of and aligned with the imaginary line 42, and resting on the shoreline stabilization devices 41a and 41b. FIG. 4D is a perspective view of the arrangement in FIG. 4C.

Figure 5A:
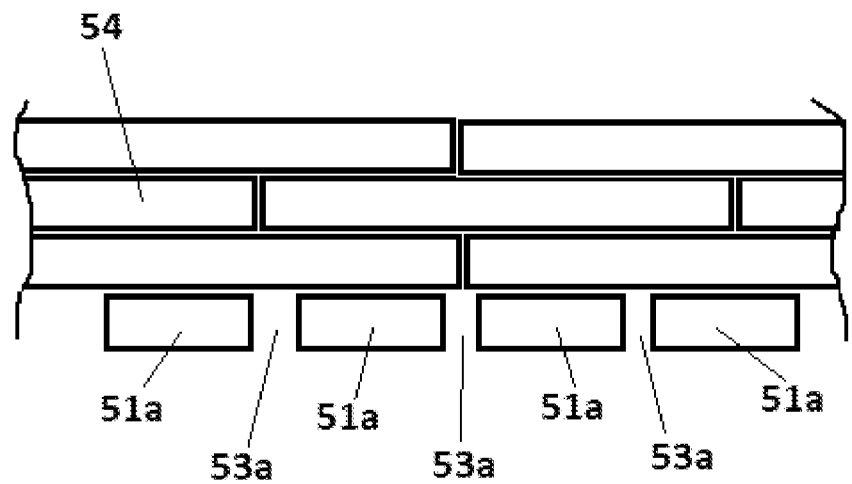
FIG. 5A is a side view of an embodiment of a system of the present invention having a plurality of shoreline stabilization devices (51a) having a gap (53a) between adjacent ones, and having a plurality of the perpendicular shoreline stabilization devices (54) stacked atop one another and arranged in a staggered or bricklike pattern.

FIG. 5A depicts a side view of a system of the present invention wherein the first shoreline stabilization devices 51a located on one side of the imaginary line (not depicted) (with the opposite side shoreline stabilization devices also not shown) have resting on their ends closest to the imaginary line a plurality of perpendicular shoreline stabilization devices 54 in a bricklike pattern. Adjacent ones of the first shoreline stabilization devices 51a are spaced apart to form a gap 53a between each adjacent pair.

Figure 5B:
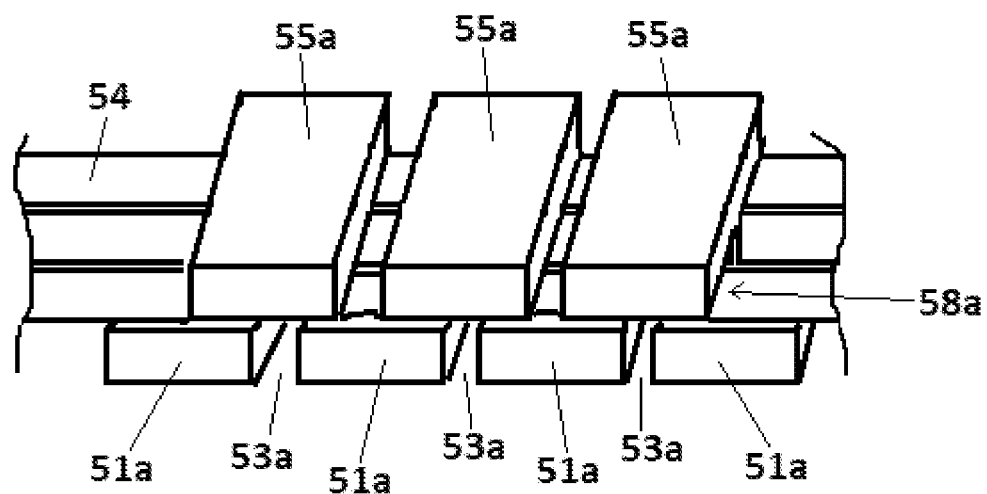
FIG. 5B is a perspective view of one side of an embodiment of the system of the present invention shown in FIG. 5A, with the addition of angled shoreline stabilization devices (55a) with gap (56a) between adjacent ones, and creating sheltered interstitial spaces (58a).

FIG. 5B shows a perspective view of the system of FIG. 5A to which angled shoreline stabilization devices 55a have been placed in a staggered arrangement having one end of each shoreline stabilization device 55a resting on two of the first shoreline stabilization devices 51a, such that the angle formed between the angled shoreline stabilization devices 55a and first shoreline stabilization devices 51a results in creation of interstitial spaces 58a.

Figure 6:
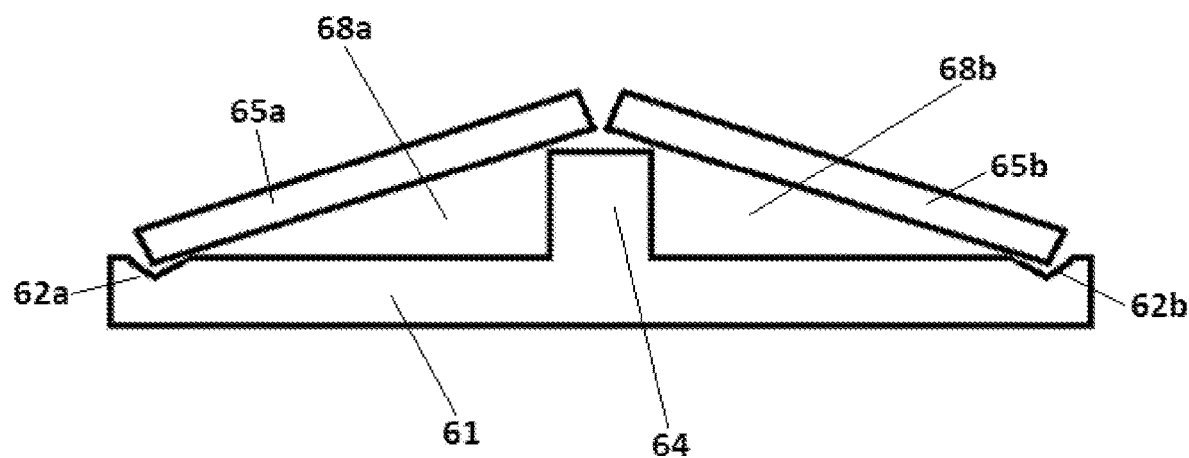
FIG. 6 is a side view of an embodiment of a system of the present invention having a base portion (61) having central protrusion (64) and inset notches (62a and 62b) each running lengthwise along the base portion, and having angled shoreline stabilization devices (65a and 65b) forming interstitial spaces (68a and 68b).

FIG. 6 provides a side view of an embodiment of the present invention comprising a base section 61 having a central protrusion 64, wherein the central protrusion 61; wherein the base section 61 further has on the top surface of the base section 61 and on each side of the central protrusion 64, inset notches 62a and 62b running lengthwise along at least a portion of the base section; and shoreline stabilization devices 65a and 65b positioned on opposite sides of the central protrusion 64, wherein each of the shoreline stabilization devices 65a and 65b have a first end resting in the inset notch 62a and 62b on the top surface on one side of the central protrusion 64 and a second end resting on central protrusion 64 to form an angle between an underside of the shoreline stabilization devices and the top surface of the base section having a slope of between about 1.5:1 and 2:1, thus forming interstitial spaces 68a and 68b between the shoreline stabilization devices 65a and 65b and the base section 61.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A system for shoreline stabilization comprising:
   a) a base section having a central protrusion from a top surface of the base section, wherein the base section and the central protrusion are formed as a single piece; wherein the central protrusion traverses at least a portion of a length of the base section; wherein the base section further has on the top surface of the base section and on each side of the central protrusion, an inset notch running lengthwise along at least a portion of the base section; and
   b) a plurality of shoreline stabilization devices positioned on opposite sides of, and along a length of, the central protrusion, with a defined gap between adjacent shoreline stabilization devices on each side of the central protrusion, wherein each of the plurality of shoreline stabilization devices have a first end resting in the inset notch on the top surface on one side of the central protrusion and a second end resting on the central protrusion to form an angle between an underside of the shoreline stabilization devices and the top surface of the base section having a slope of between about 1.5:1 and 2:1.

2. The system for shoreline stabilization of claim 1, wherein each pair of shoreline stabilization devices on opposite sides of the central protrusion are positioned to fully align with one another across the central protrusion.

3. The system for shoreline stabilization of claim 1, wherein the plurality of shoreline stabilization devices on opposite sides of the central protrusion are positioned in a staggered arrangement such that the defined gap defined by two adjacent shoreline stabilization devices on one side of the central protrusion aligns with the end of a shoreline stabilization device on an opposite side of the central protrusion.

4. The system for shoreline stabilization of claim 1, wherein the base section comprises:
   a) a plurality of primarily calcium carbonate material obtained from living sources;
   b) a cement that is capable of binding the plurality of primarily calcium carbonate material in a block; and
   c) wherein the plurality of primarily calcium carbonate material is bound together in a block form by the cement.

5. The system for shoreline stabilization according to claim 4, wherein the block form comprises one or more reinforcing rods.

6. The system for shoreline stabilization according to claim 5, wherein the one or more reinforcing rods comprise rebar.

7. The system for shoreline stabilization according to claim 4, wherein the plurality of primarily calcium carbonate material is aquatic shells.

8. The system for shoreline stabilization according to claim 4, wherein the cement is a bio-cement.

9. The system for shoreline stabilization according to claim 1, wherein the inset notch is continuously running lengthwise along at least a portion of the base section.

* * * * *